April 1, 1924.

J. WILKINSON

FLOW METER

Filed Dec. 29, 1920  2 Sheets-Sheet 1

1,488,966

Inventor:
James Wilkinson,
by Albert G. Davis
His Attorney.

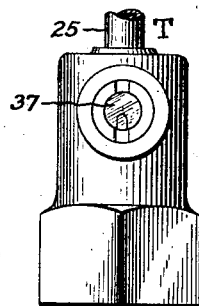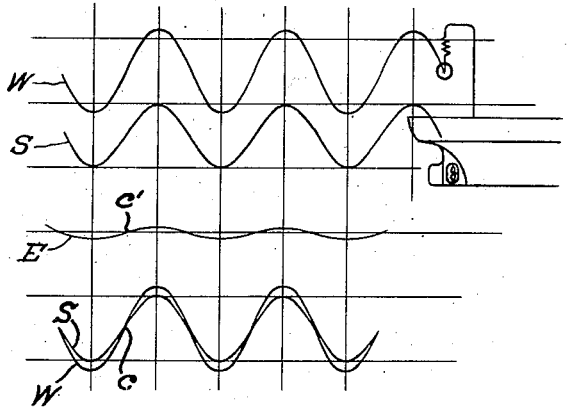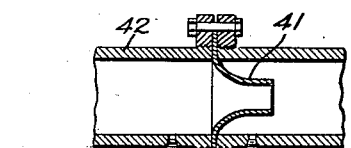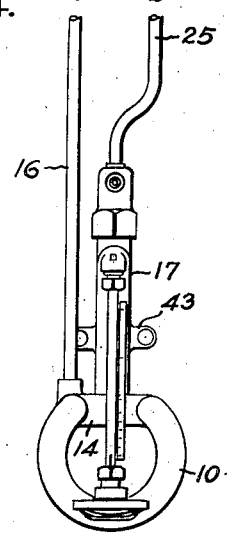

Patented Apr. 1, 1924.

1,488,966

UNITED STATES PATENT OFFICE.

JAMES WILKINSON, OF SCHENECTADY, NEW YORK, ASSIGNOR TO GENERAL ELECTRIC COMPANY, A CORPORATION OF NEW YORK.

FLOW METER.

Application filed December 29, 1920. Serial No. 433,870.

*To all whom it may concern:*

Be it known that I, JAMES WILKINSON, a citizen of the United States, residing in Schenectady, in the county of Schenectady, State of New York, have invented certain new and useful Improvements in Flow Meters, of which the following is a specification.

The present invention relates to flow meters of the U-tube type which as is well understood comprise a pressure difference creating device for creating a pressure difference which bears a definite relation to the rate of flow, a U-tube manometer containing a suitable indicating liquid such as mercury, and leading and trailing pressure pipes which connect the pressure difference creating device to the respective legs of the U-tube.

Such instruments as are now on the market are satisfactory for use where the instrument is stationary with respect to the earth. They are not satisfactory, however, under conditions where the instrument is not stationary with respect to the earth, for example, on shipboard where, due to the rolling of the ship, the instrument is in continuous motion because of the fact that the movements dash the indicating liquid around so it cannot give true readings.

The object of my present invention is to provide an improved structure in an instrument of this character which will operate accurately and satisfactorily when subjected to continuous motion relatively to the earth such as is met with on shipboard and for a consideration of what I believe to be novel and my invention, attention is directed to the accompanying description and the claims appended thereto.

Figure 1:
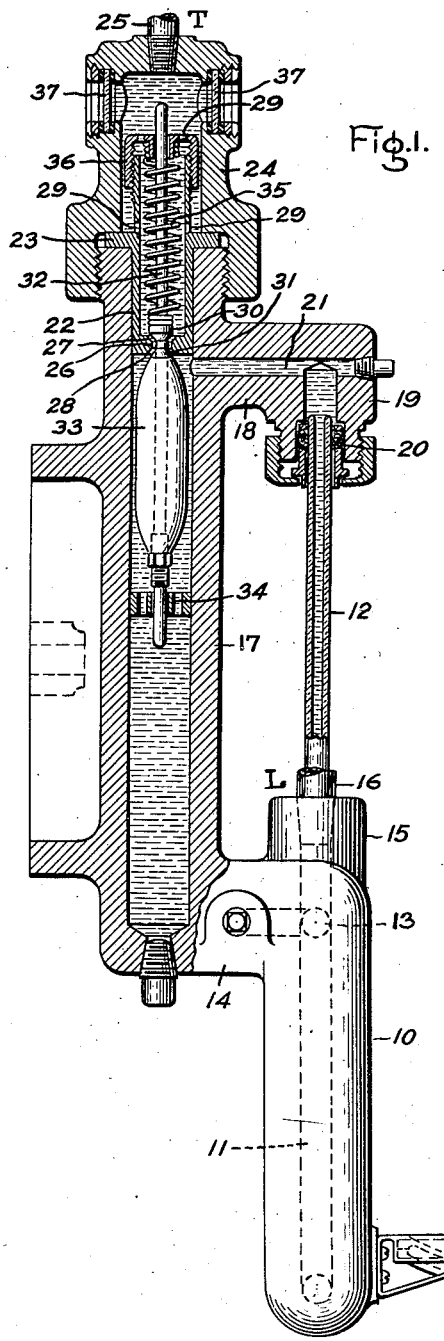
Figure 3:
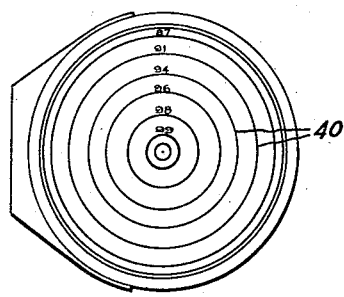

In the drawing, Fig. 1 is a vertical sectional view of a flow meter embodying my invention; Fig. 2 is a front elevation; Fig. 3 is a plan view of a level indicator; Fig. 4 shows the instrument connected to a pressure difference creating device; and Fig. 5 is a diagram illustrating the operation of the instrument.

Referring to the drawing, the U-tube comprises a leading leg 10 which is a segment of a circle, thereby providing a circular well 11, and a trailing leg 12 in the form of a straight tube communicating at its lower end with the lowermost point of well 11. The upper ends of well 11 are connected together by a passage 13 in a transverse wall 14 which may be formed integral with leg 10. On wall 14 is a boss 15 having a passage connecting with passage 13, and connected to this boss is the leading pressure pipe 16 which conveys pressure from the pressure difference creating device to the U-tube. By this arrangement both ends of the curved well 11 are in communication with pipe 16 and are directly subjected to the leading pressure.

Supported by transverse wall 14 is a vertical tube 17 parallel to tube 12 and projecting from it is an arm 18 having a downwardly turned end 19 in which the upper end of tube 12 is fastened. A suitable packing 20 is provided to make a tight joint between tube 12 and end 19, and in arm 18 and end 19 is a passage 21 which connects tube 12 to the upper end of tube 17. The upper end of tube 17 is open and seated in it is a valve cage 22 having a flange 23 which rests on the top surface of the tube and is clamped thereagainst by a head 24 which screws over the end of the tube. This fixes valve cage 22 firmly in tube 17. Connected to the upper end of head 24 is a pipe 25 which forms the trailing pressure connection of the meter. Passage 21 communicates with tube 17, below the lower end of valve cage 22. In the bottom wall of valve cage 22 is an opening 26 having valve seats 27 and 28 on opposite sides thereof and it is through this opening that trailing pressure pipe 25 communicates with tube 12, cage 22 being provided with openings 29 which connect the interior of the cage with the interior of head 24. Cooperating with valve seats 27 and 28 is a valve structure comprising two members 30 and 31, carried by a valve stem 32. When the valve stem 32 is lowered valve member 30 engages seat 27, when the stem is raised valve member 31 engages seat 28, and when in an intermediate position the valve members are spaced from both seats. Connected to the valve structure is a weight 33 which is carried by a depending extension of stem 32, the end of such extension passing through a guide 34. The valve structure with the weight attached thereto is suspended on and supported by a coiled spring 35 which surrounds the upper end of stem 32 and has one end attached to a cap 36 which closes the upper end of and forms a part of cage 22 and the other end attached to valve member 30. The strength of spring 35 is such that with the meter stationary, it supports the valve structure with both valve members spaced from their seats as shown in Fig. 1. The upper end of valve stem 32 passes through an opening in cap 36 which serves as a guide for it and terminates in front of glazed openings 37 in head 24 through which movements of the end of the stem may be observed.

Connected to the front of the instrument at its lower end is a universal level comprising a chamber 38 in the form of a segment of a sphere, containing a drop of indicating liquid 39 such as mercury. As shown in Fig. 3, the inner surface of the level is provided with a scale comprising concentric circles 40. By the use of this level the instrument can be accurately leveled and its deviations from level position noted.

In Fig. 4 I have shown the leading and trailing pressure pipes 16 and 25 connected to a pressure difference creating device in the form of a flow nozzle 41 arranged in a conduit 42 through which the fluid to be metered flows. The leading pressure pipe 16 is connected to conduit 42 on the up stream side of nozzle 41 and the trailing pressure pipe is connected thereto on the down stream side. When installed the indicating instrument is fastened to a wall by means of attaching lugs 43 which are provided with holes 43ᵃ through which bolts may be passed. Pipes 16 and 25 may then extend any suitable distance to conduit 42.

Alongside tube 12 is a scale plate 44 on which is marked a suitable scale to indicate flow. The indicating liquid, usually mercury, is shown at 45, and such an amount is filled into well 14 and tube 12 that at no flow, which means that the liquid level is the same in both well 11 and tube 12, the meniscus 45ᵃ of the indicating liquid in tube 12 stands at the center of the circle of well 11. This is the zero on scale plate 44. Because of this arrangement, tilting of the instrument in the plane of well 11 and tube 12 does not affect the zero reading.

The operation of a flow meter of this general type is well understood. The flow of the fluid to be metered, for example steam, through the conduit acts on the pressure difference creating device and creates a pressure difference which bears a definite relation to the rate of flow. This pressure difference is transmitted to well 11 and tube 12 causing a deflection of the indicating liquid 45, the same lowering in well 11 and raising in tube 12. The flow, therefore, is indicated by the deflection of the indicating liquid. When measuring steam, which is assumed to be the case in the present instance, the spaces in the legs of the meter above the indicating liquid and also the pipes 16 and 25 are filled with water due to steam condensing in them, and such water is shown in the drawing. In this connection it will be noted that tube 17 is filled with such water.

By experiments I have found that a ship's tossing motion follows a sine law and that a weight suspended from the ship by a spring follows the motion of the ship with but very slight lag, the spring and weight being well damped. Referring to Fig. 5 the curve S represents the tossing motion of a ship relatively to the earth and curve W represents the tossing motion of a spring suspended weight relatively to the earth. In the lower portion of Fig. 5 these two curves are shown superimposed one on the other and it will be noted that the lag of the weight curve behind the ship curve is but little. Also that they cross each other at a point $c$ which is at or near the mid-points of the ship's pitching motion. The curve E indicates the motion of the weight with respect to the ship and it will be noted that at point $c'$ corresponding to point $c$ the weight is stationary relatively to the ship.

From a consideration of the foregoing it will be seen that when a meter embodying my invention is mounted on a ship, the meter will have a tossing motion following that of the ship, i. e., curve S and the weighted valve structure will have a tossing motion tending to follow the curve W. The motion of the weight relatively to the ship and the stationary part of the meter tends to follow curve E. The result is that valve members 30 and 31 will be brought into engagement with their seats alternately and that for a definite period during each cycle both valves will be open. This latter condition will occur in the vicinity of the point $c$ of the curves, Fig. 5, that is, during the time the two curves are crossing each other; they will open a short interval before the point $c$ is reached and close a short interval thereafter. The duration of opening will depend on the lag of the weight and the distance of the valve members from their seats. It is only during the period when valve members 30 and 31 are both open that the trailing leg of the pressure difference creating device is in communication with leg 12 of the meter, and hence it is only during such periods that the indicating liquid can be moved in response to variations in flow. As pointed out above, these periods occur near the mid-points of the ship's tossing or when the ship is substantially level. At all other times either valve 30 or 31 is closed, and prevents movements of the indicating liquid of the meter. These periods occur at intervals of about three seconds in the average case.

It will thus be seen that by my invention I provide an arrangement wherein the pressure creating device of the meter is connected to the U-tube only during periods when the ship is substantially horizontal or midway between the upper and lower crests of its tossing movement. The differential pressure is thus applied to the meter to move the indicating liquid at an instant when its level in the manometer is not affected by the ship's position. At all other times, one or the other of valves 30 and 31 are closed to trap the indicating liquid in the manometer and prevent its movement or splashing around due to the ship's tossing. I have shown the weighted valve structure arranged on the trailing side of the meter, but it will be understood that it may be arranged on the leading side or on both, as found desirable.

In installing my improved meter on shipboard, I mount it so it stands transversely of the ship. The rolling motion of the ship will therefore affect it but little, if any, because of the annular form of the well. When the meter tilts the level at one side of well 11 lowers and at the other side raises by the same amount whereby one tends to neutralize the movement of the other.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A flow meter for use on shipboard comprising a pressure difference creating device and a manometer, characterized by the fact that a valve mechanism actuated by tossing movement of the ship is provided for connecting the device to the manometer when the ship is substantially horizontal and disconnecting it therefrom at other times.

2. A flow meter for shipboard use comprising a pressure difference creating device, a pressure responsive instrument, and leading and trailing pipes connecting the device to the instrument, characterized by the fact that valve means is provided for closing the connection between the device and instrument except when the ship is substantially horizontal.

3. In a flow meter subject to alternating movement toward and away from the earth, the combination of a U-tube manometer, a pressure difference creating device, leading and trailing pipes connecting the manometer to the device, and a yieldably supported weighted valve structure adapted to close the passage through one of said pipes when at or near the crests of such alternating movement.

4. In a flow meter, the combination of a U-tube manometer, a pressure difference creating device, leading and trailing pipes connecting the manometer to the device, one of said pipes being provided with a valve seat, a spring supported weight, and a valve carried by said weight for cooperation with said seat to close therewith preventing flow therethrough when the meter is moved vertically.

5. In a flow meter, the combination of a U-tube having indicating liquid therein, and a spring-supported weighted valve means vertically movable between two limits at which the valve is closed but normally maintained at an intermediate position at which the valve is open and adapted to prevent movement of the indicating liquid except when the valve is open.

6. In a flow meter, a U-tube comprising a well, and a tube rising therefrom, and a spring-supported weighted valve means for closing the end of said tube when said meter is subject to alternating vertical movement but normally being maintained in an open position when the meter is not subject to such movement or when the meter is substantially at the mid point between the upper and lower limits of such movement.

7. In a flow meter, a U-tube comprising a well in the form of a curved chamber, and a tube rising from its central point, a scale plate supported adjacent the tube with its zero at the center of curvature of said chamber, and a spring-supported weighted valve means for closing the upper end of said tube when said meter is subject to alternating vertical movement but normally being maintained in an open position when the meter is not subject to such movement or when the meter is substantially at the mid point between the upper and lower limits of such movement.

8. In a flow meter, a U-tube comprising a well in the form of a curved chamber, a tube rising from its central point, a scale plate supported adjacent the tube with its zero at the center of curvature of said chamber, means forming a passage which communicates with the top of said tube and has vertically spaced valve seats therein, valve means cooperating with said spaced valve seats, and a yielding means normally supporting said valve means out of contact with either seat.

In witness whereof, I have hereunto set my hand this 28th day of December, 1920.

JAMES WILKINSON.